United States Patent [19]
Sinnhuber

[11] Patent Number: 5,957,490
[45] Date of Patent: Sep. 28, 1999

[54] ARRANGEMENT FOR PROTECTION OF A VEHICLE OCCUPANT

[75] Inventor: Ruprecht Sinnhuber, Gifhorn, Germany

[73] Assignee: Volkswagen AG, Wolfsburg, Germany

[21] Appl. No.: 08/912,490

[22] Filed: Aug. 18, 1997

[30] Foreign Application Priority Data

| Aug. 22, 1996 | [DE] | Germany | 196 33 743 |
| Aug. 27, 1996 | [DE] | Germany | 196 34 472 |
| Mar. 1, 1997 | [DE] | Germany | 197 08 345 |

[51] Int. Cl.$^6$ .................................................. B60R 21/32
[52] U.S. Cl. ...................... 280/735; 280/736; 280/743.2
[58] Field of Search ............................ 280/735, 736, 280/743.2, 743.1, 742

[56] References Cited

U.S. PATENT DOCUMENTS

| 5,161,820 | 11/1992 | Vollmer | 280/730 |
| 5,308,113 | 5/1994 | Moriset | 280/743 |
| 5,330,226 | 7/1994 | Gentry et al. | 280/735 |
| 5,366,241 | 11/1994 | Kithil | 280/735 |
| 5,405,166 | 4/1995 | Rogerson | 280/739 |
| 5,501,488 | 3/1996 | Saderholm et al. | 280/739 |
| 5,513,879 | 5/1996 | Patel et al. | 280/739 |
| 5,551,723 | 9/1996 | Mahon et al. | 280/737 |
| 5,762,367 | 6/1998 | Wolanin | 280/743.2 |

FOREIGN PATENT DOCUMENTS

| 3809074 | 10/1989 | Germany . |
| 4023109 | 1/1992 | Germany . |
| 4334606 | 4/1994 | Germany . |
| 19515980 | 11/1995 | Germany . |
| 19526547 | 1/1996 | Germany . |
| 9526334 | 1/1997 | Germany . |
| 2303479 | 2/1997 | United Kingdom . |

Primary Examiner—Paul N. Dickson
Attorney, Agent, or Firm—Baker & Botts, L.L.P.

[57] ABSTRACT

The invention relates to a passenger protection arrangement for a vehicle having at least one air bag capable of being filled by an inflation device. Provided in addition is a sensor system, combined with a control unit, for releasing and influencing the inflation device with regard to the filling characteristic of the air bag. For recognizing passengers in a so-called "out-of-position" posture, elements by which expansion behavior or a specified cover section of the air bag is detectable are proposed as components of the sensor system. The signals produced by these elements are capable of being processed in the control unit for influencing the inflation device.

27 Claims, 5 Drawing Sheets

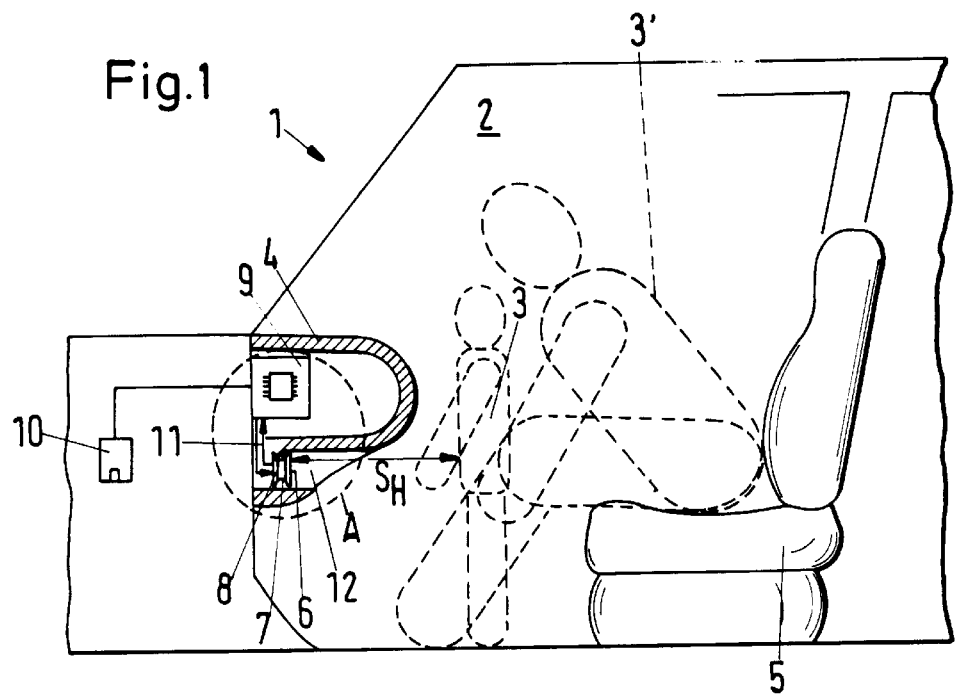
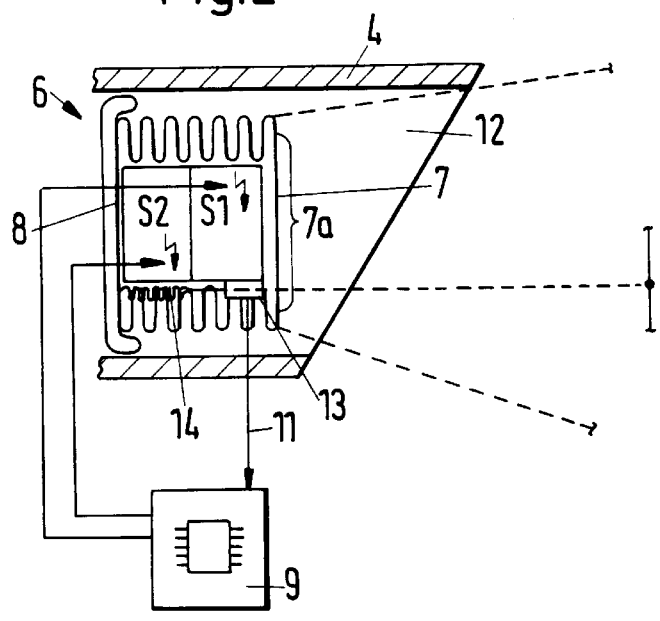
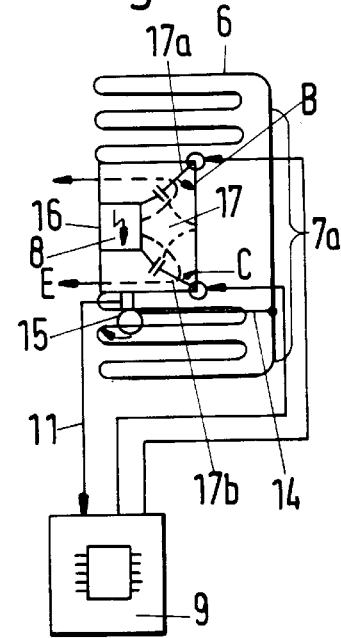

ARRANGEMENT FOR PROTECTION OF A VEHICLE OCCUPANT

BACKGROUND OF THE INVENTION

The invention relates to a passenger protection arrangement for a vehicle.

So-called air-bag devices, with air bags capable of being filled by inflation devices, have become widespread for accident protection for passengers in vehicles and have generally proven their worth. In order to optimize such passenger protection arrangements, efforts have more recently been concentrated on satisfactorily solving the so-called "out-of-position" problem. This problem area is discussed in detail in the introduction of the description of DE 195 26 547. Here, reference is made expressly to the statements in columns 1 to 3 therein.

Various approaches have been disclosed for solving the problem. Thus, for example, DE 38 09 074-A1, DE 40 23 109-A1, U.S. Pat. No. 5,366,241 and DE 43 41 500 belong to a type of passenger protection arrangements in which the position or posture of the passenger under consideration is constantly determined by a comparatively costly sensor system in order, in case of a vehicular accident, to fill the inflatable air bag to match. Optionally, suppression of air bag filling may also be provided, as described, for example, in EP 0,458,102-A1. The safety device last mentioned is very simple in terms of apparatus, but does not permit selective control of inflation behavior for passengers who happen to be in an "out-of-position" posture on the seat of the vehicle.

A second type of passenger protection arrangement provides structural measures on the air bag and/or on the gas generator housing for eliminating the "out-of-position" problem. In this connection, DE 43 34 606-A1, DE 195 26 547-A1, DE 195 15 980-A1, U.S. Pat. No. 5,405,166 and U.S. Pat. No. 5,501,488 may be mentioned as prior art. In particular, in the last two sources cited, it is described how the speed of expansion of the air bag is decreased by contact with a cover section of the bag. The air bag itself is designed so that when the cover encounters an obstacle the mass flow emerging from a gas generator is controlled. In this way, hitting of an obstacle (for example, a child standing in the floor space or a passenger found in "out-of-position" posture) by the full mass flow can be prevented or limited.

SUMMARY OF THE INVENTION

Against this background, the object of the invention is to make available a passenger protection arrangement wherein the "out-of-position" problem can be satisfactorily solved with relatively little expenditure in terms of apparatus.

According to the invention a sensor system already present in the vehicle for releasing and optionally also for influencing the filling characteristic of the air bag is supplemented to the effect that the expansion behavior, for example, the speed of expansion, of a specific cover section of the air bag is detectable. For this purpose, signal-generating elements are connected with a control unit in such fashion that it is capable of influencing the inflation device and hence also the filling characteristic of the air bag. Accordingly, the invention is based upon the reasoning on the part of the inventor that, when the air bag cover strikes an obstacle, the cover section turned toward the obstacle is slowed down in its motion or is halted entirely. The signal capable of being derived therefrom by, for example, a displacement or force transducer is used in multiple-stage inflation devices, for example, to suppress firing of the second or any additional stage or, in a single-stage inflation device, to limit the mass flow or to carry it past the air bag into, for example, the floor space or behind the dashboard.

A special advantage of the arrangement according to the invention may be seen in that already existing passenger protection arrangements need be supplemented only by sensor elements for the detection of expansion speed. A tension member in the form of a cable, strap or hose may, analogous to the integration of intercepting straps in previous passenger protection arrangement (see, for example, DE 43 34 606-A1, already mentioned above), be inserted without any problem by stitching. Conventional technology may likewise be used for insertion of the displacement or force transducer. An especially simple arrangement consists, for example, in that the tension member acts on a rotary or linear cable potentiometer or a tachometer whose drive is displaced rotationally by the tension member during filling of the air bag. The signal generated in this way can then be processed in a control means already present for release of the air bag.

An additional advantage of the passenger protection arrangement according to the invention may be seen in that the sensor elements for the detection of expansion behavior need be in operation only when occurrence of an accident is identified. In contrast, the constant monitoring systems mentioned at the beginning require continual operation of all control and sensor elements.

BRIEF DESCRIPTION OF THE DRAWINGS

Aadvantageous embodiments of the invention are represented schematically in the drawing, wherein FIG. 1 shows a vehicle with essential elements of the passenger protection arrangement according to the invention;

FIG. 2 is a view according to section A in FIG. 1 showing a first variant of the arrangement;

FIG. 3 is a view according to the section A in FIG. 1 showing a second variant of the arrangement;

DESCRIPTION OF THE PREFERRED EMBODIMENTS

Figure 4:
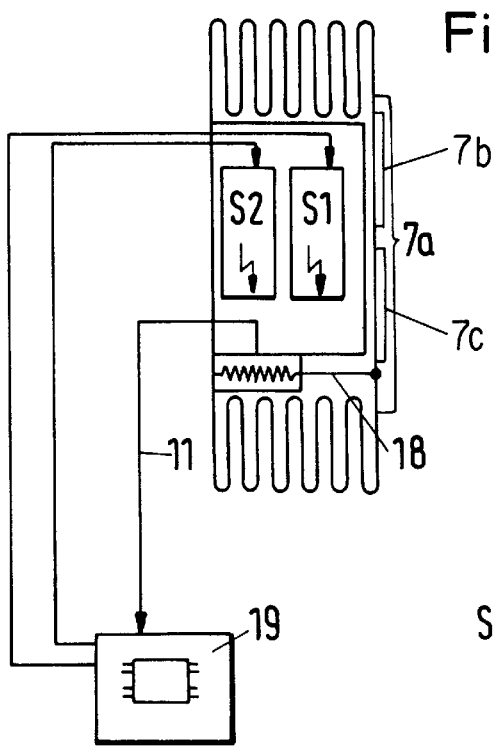
FIG. 4 is a view according to the section A in FIG. 1 showing a third variant of the arrangement.

In all figures, like components have like reference numerals.

FIG. 1 shows a vehicle, labelled generally 1, in whose passenger compartment 2 a child passenger 3 is standing between a dashboard 4 and a vehicle seat 5. For an air bag module 6 accommodated within the dashboard 4, this location of the child passenger 3, attributable to inattentiveness or indifference of the operator of the vehicle, represents the "out-of-position" problem already repeatedly mentioned in the introduction of the description. Cases in which an adult passenger 3' (indicated here by broken lines) is in bent-forward posture on the vehicle seat 5 are similar.

An air bag module 6 has an air bag 7 and a gas generator 8, acting as inflation device, which in turn is capable of being acted upon by a control unit 9. The latter is connected with, inter alia, at least one crash sensor 10, which may be accommodated at generally well-known locations on the body of the vehicle. It is pointed out here that the crash sensor 10 is represented only symbolically. Additionally or alternatively, a sensor system distributed over the entire vehicle body, which can be used for the fullest possible detection of any accident occurrence, may be provided. Via a line 11, designed as a signal-transmitting element, the control unit 9 is connected with the air bag module 6 in such fashion that the expansion behavior of the air bag 7 after firing of the gas generator 8 can be detected. Here, so-called accordion folding is indicated schematically for the air bag 7. However, other types of folding are possible (for example, rotary folding, compressed folding, etc.).

A firing channel 12, which is provided in a lower region or below the dashboard 4, may also be noted in the configuration represented in FIG. 1. The firing channel 12 provides that in neither the case of the passenger 3' bent forward nor that of the standing passenger 3 is the head of the person fired at directly. Rather, this type of air bag control results in an impact on body parts which themselves are less vulnerable to injury and in addition are also more favorable kinematically with regard to evasive movement of the passenger concerned after firing. Here, the air bag module 6 is set back with respect to the contour of the dashboard 4, so that in the normal posture of the passenger 3' it is not visible. In this configuration, a cap or hood covering the air bag module may alternatively be omitted. The omission of such a structural component not only minimizes manufacturing and assembly costs, but contributes substantially to allowing the air cushion 8 to be unfolded without hindrance.

FIG. 2 shows an enlarged representation of section A in FIG. 1. Of outstanding importance here is an inductive displacement transducer 13, through which a tension member 14 is capable of being driven. The latter is designed as a cable, strap or hose and has either metal sections or metal particles by which magnetic asymmetries are capable of being generated during the inflation process. Said asymmetries are produced by linking of the tension member 14 to a front region 7a of the air bag 7 and the latter's movement in the direction of the passenger 3 or 3'. In this way, the tension member 14 is drawn through the inductive displacement transducer 13 and generates measurable pulses in it as a function of pass-through speed. Advantageously a region in the cover of the air bag 7 is chosen, as specified cover section 7a, which is the first to be impacted by the mass flow emerging from the gas generator 8 and hence ensures the greatest likelihood that it will impact an obstacle (passenger 3 or 3') first, before other cover sections. Here, the tension member 14 is stitched on in the region of the front section 7a and is fastened to a housing section of the air bag module 6 so that eve n at extreme accelerations it always experiences restoring forces (braking, feathering, etc.). Distorted results due to forces of inertia of the tension member are thereby greatly reduced.

Here, the gas generator 8 is designed as a staged generator with firing stages S1 and S2. At the start of the inflation process, first the firing stage S1 is fired. Then, in a manner to be explained later (see descriptions for FIGS. 5 and 6), it is determined by cooperation of the inductive displacement transducer 13 and the control unit 9 whether an "out-of-position" problem exists. If so, firing of stage S2 is suppressed. If the control unit 9 finds no adverse effect of expansion of the air cushion 6, firing of stage S2 takes place, so that the entire air cushion 7 can unfold completely.

In the example of FIG. 3, a tachometer 15, which is fastened to a generator housing 16 and is capable of being driven whenever the front region 7a is moved toward the passenger 3 or 3' by activation of the gas generator, is used as displacement transducer. Here, so-called compressed folding, which permits especially sensitive adjustment of the degree of filling required in each instance, is symbolically indicated as folding for the air bag 7. Here, a single-stage gas generator is provided as inflation device, wherein in an initial phase of the inflation process the mass flow is first introduced into the air bag. A diffusor region 17 is designed here so that upon sensing of an obstacle (in this connection, see the description for FIGS. 5 and 6), flap valves 17a and 17b are displaced according to arrows B and C so that, on the one hand, the opening toward the air bag 6 is closed off and, on the other, the mass flow delivered by the gas generator 8 according to the arrows D and E is directed past the air bag into the dashboard 4 or into a floor space not further labelled here. In accordance with the invention, here the inflation device as a whole accordingly is made up of the gas generator 8, the diffusor region 17 and the valve structure consisting of the flap valves 17a, b.

As an additional variant, a force transducer 18, here indicated only symbolically, to which the tension member 14 is fastened, may alternatively be provided. This sensor principle starts out from the consideration on the part of the inventor that upon impact of the front region 7a on an obstacle, because of interference with expansion, the force on the force transducer 18 is increased by a gradient variation. This variation of force increase can then be processed by the control unit 19 so that firing of stage S2 does not occur.

It is expressly pointed out here that the structural principles concerning folding of the air bag 6, concerning diversion of the mass flow represented in FIGS. 2 to 4, regarding the use of force and displacement transducers and with reference to the use of staged generators, may be varied as desired.

Accordingly, use of the inductive displacement transducer 13 in conjunction with the valve arrangement assigned to the diffusor 17 is alternatively possible. Likewise, the compressed folding represented in FIG. 3 may alternatively be used for the air bags according to the examples in FIGS. 2 and 4. Detection of expansion behavior may also be performed optically. For this, the tension member 14 is to be provided with a stripe pattern and, for example, carried past an optical sensor in the fashion of a bar code reader.

Pressure-sensitive sheets, 7b which, in the event of an impact on an obstacle, undergo a change in their inner electrical resistance, are alternatively possible. Such sheets may be stitched on the cover in the front region 7a or woven into it as an integral component as schematically illustrated in FIG. 4.

Likewise possible, in addition or alternatively to the abovementioned arrangements of sensing expansion behavior, is the use of piezo elements 7c, which are stitched into the cover of the air bag 7 in the front region 7a as schematically illustrated in FIG. 4, so that they are unable to exert a projectile effect on the passenger during the inflation process. For this purpose, a pocket, for example, accommodating a piezo element from which a signal-transmitting line is carried to the control unit 9, may be stitched in an inner wall of the cover.

Figure 5:
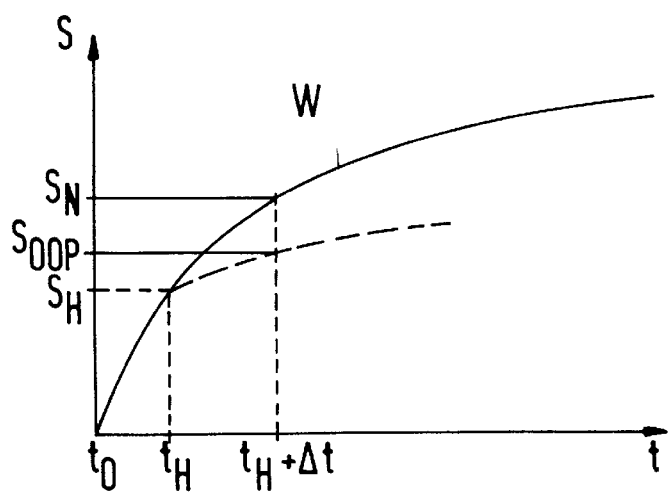
FIG. 5 is a diagram for the path-time behavior of a specified cover section.
Figure 6:
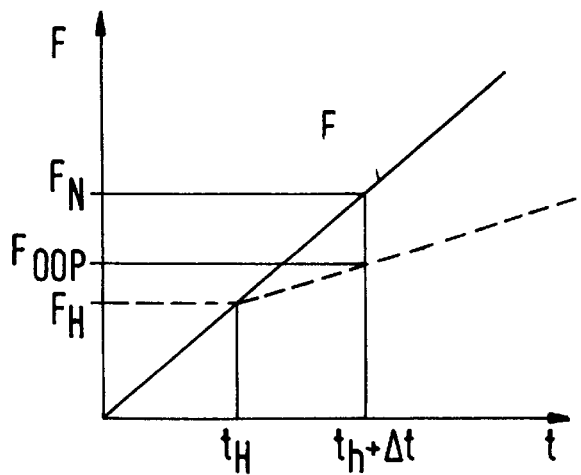
FIG. 6 is a diagram for the force-time behavior for a specified cover section.

The principle of operation of the examples mentioned above will be explained in detail with the aid of FIGS. 5 and 6. Thus, for example, the diagram in FIG. 5 shows the path-time behavior for the front region 7a. A curve labelled $W_{soll}$ is produced whenever the air bag 6 can be unfolded unrestricted. The data belonging to the curve $W_{soll}$, the reference curve, may be stored in a characteristics field of the control means 9. Activation of the single-stage or multiple-stage inflation device, triggered by the crash sensor 10, takes place at time $t_o$. Impact on the passenger 3 or 3' takes place at time $t_H$. Up to that point, the distance $S_H$ has been covered. I.e., this is the distance between the air bag module 6 and the passenger 3 or 3' (see also FIG. 1). The latter represent an obstacle to expansion of the air bag 7 and thus cause a difference in expansion behavior so that the actual curve, here indicated by dashed lines, runs below the characteristic curve $W_{soll}$. After lapse of a specified time span $\Delta t$, the path actually covered by the front region 7a and hence also by the tension member 14 is determined. Then, if the difference between the path $S_N$ (normal expansion of the air bag 6) and the actual path $S_{OOP}$ exceeds a specified amount, this is processed by the control unit 9 so that either firing of additional stages does not take place or else the mass flow of gas is diverted. Signal detection and alternatively signal processing may be varied, for example, by the insertion of differentiating members, so that variation in speed or acceleration of the front region 7a may be chosen as the criterion for termination of air bag filling.

Alternatively, instead of path-time behavior, force-time behavior during the inflation process may be selected for evaluation. In this connection, FIG. 6 shows a characteristic curve $F_{soll}$ for the case where unimpeded filling of the air bag 7 takes place. This may likewise be stored in the control unit 9 in addition or alternatively to the characteristic curve $W_{soll}$. A force $F_H$ on the force transducer 18 is detected at time $t_H$. Due to striking of the front region 7a on the passenger 3 or 3' less expansion or compression takes place in the force transducer 18, so that the amount of the force actually detected at time $t_H$ corresponds to the value $F_{OOP}$. When a specified difference between the amounts $F_N$ (amount of the force in normal expansion) and $F_{OOP}$ is exceeded, termination or limitation of filling of the air bag 7 is in turn initiated. By inserting differentiating elements, differentials in accordance with time may additionally or alternatively be used as the criterion for judgment in the evaluation of force signals.

Figure 7:
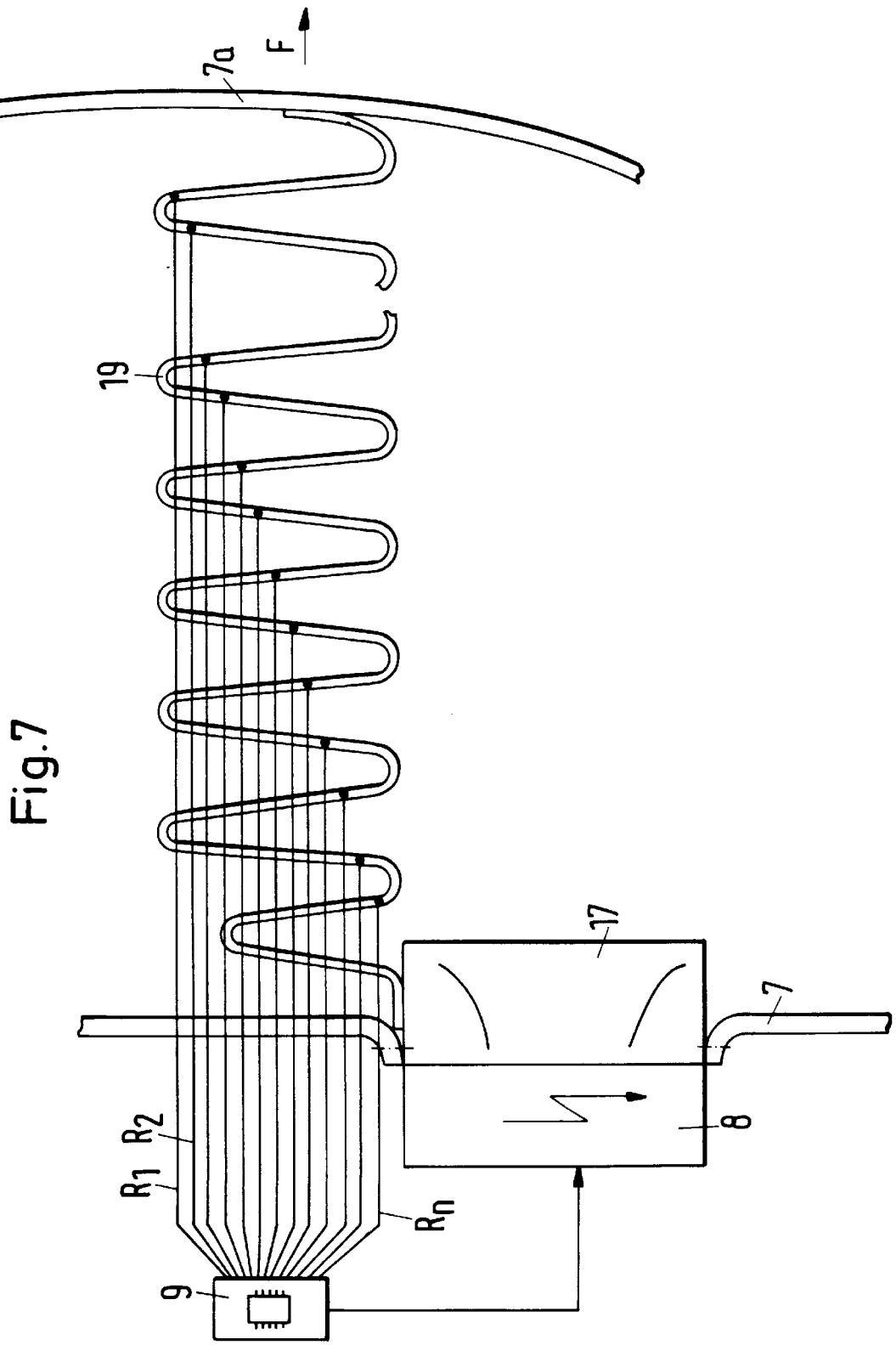
FIG. 7 is a view showing an additional variant having a sensor system for detecting expansion behavior.
Figure 8:
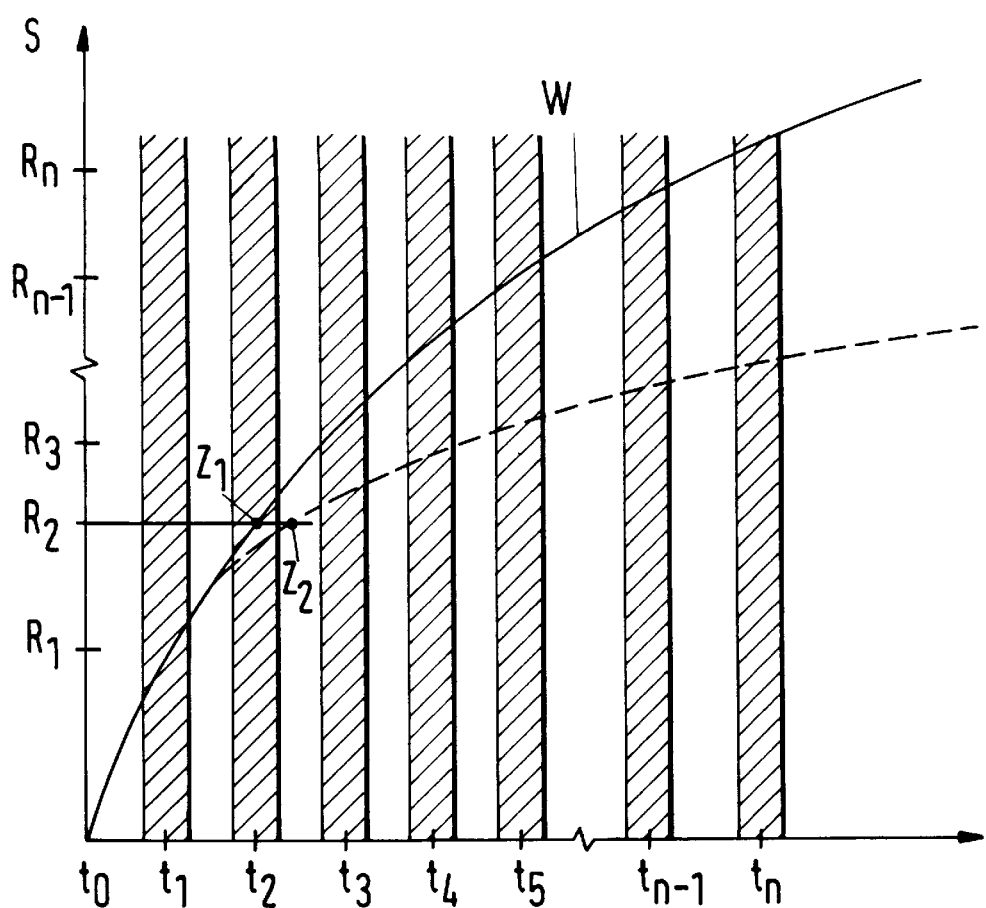
FIG. 8 is a graphical representation of the operation of the sensor system shown in FIG. 7.

The example sketched in FIG. 7 shows as a folding member a conventionally designed intercepting strap 19, already proven in practice, which here is folded together in loops in a rest position. Tearing elements $R_1$ to $R_n$ are attached at retaining sections indicated symbolically by heavy dots, which elements are connected with the control unit 9 in such a way that they emit a signal whenever the front cover section 7a is moved away in the direction of the arrow F after activation of the inflation device 8. In case of unimpeded expansion of the air bag the tearing elements designed for example as a thread or thin strap or thin wire, tear away from the group or out of connectors and so, starting from release time $t_o$, produce a specific signal pattern in the control unit 9 over time.

one possibility for evaluation of such a signal pattern is shown in FIG. 8. Thus, for example, reference times $t_1$ to $t_n$ are stored in the control unit 9 in a characteristics field according to the curve labelled $W_{soll}$, to which signals from the tearing elements $R_1$ to $R_n$ must be supplied for unimpeded filling of the air bag 7. Each individual one of these reference times is assigned a specified time window, within each of which it is detectable whether the air bag 7 has struck an obstacle. In such case—i.e., when expansion is impeded because of the presence of an OOP problem—the path-time course drawn in a broken line is produced for the front cover section 7a (in this connection, see also the description for FIG. 5). This results in delayed tear-off or tear-through of the tearing element $R_2$ as compared with the reference tearing point $Z_1$, which leads to an actual tearing point $Z_2$. The latter lies outside the time window belonging to $R_2$ by $t_2$, which in the control unit 9 produces a control signal for variation of the filling characteristic of the air bag 7. This type of sensor system and evaluation may be applied to all foldings of air bags and forms of influence on inflation devices described above.

Figure 9:
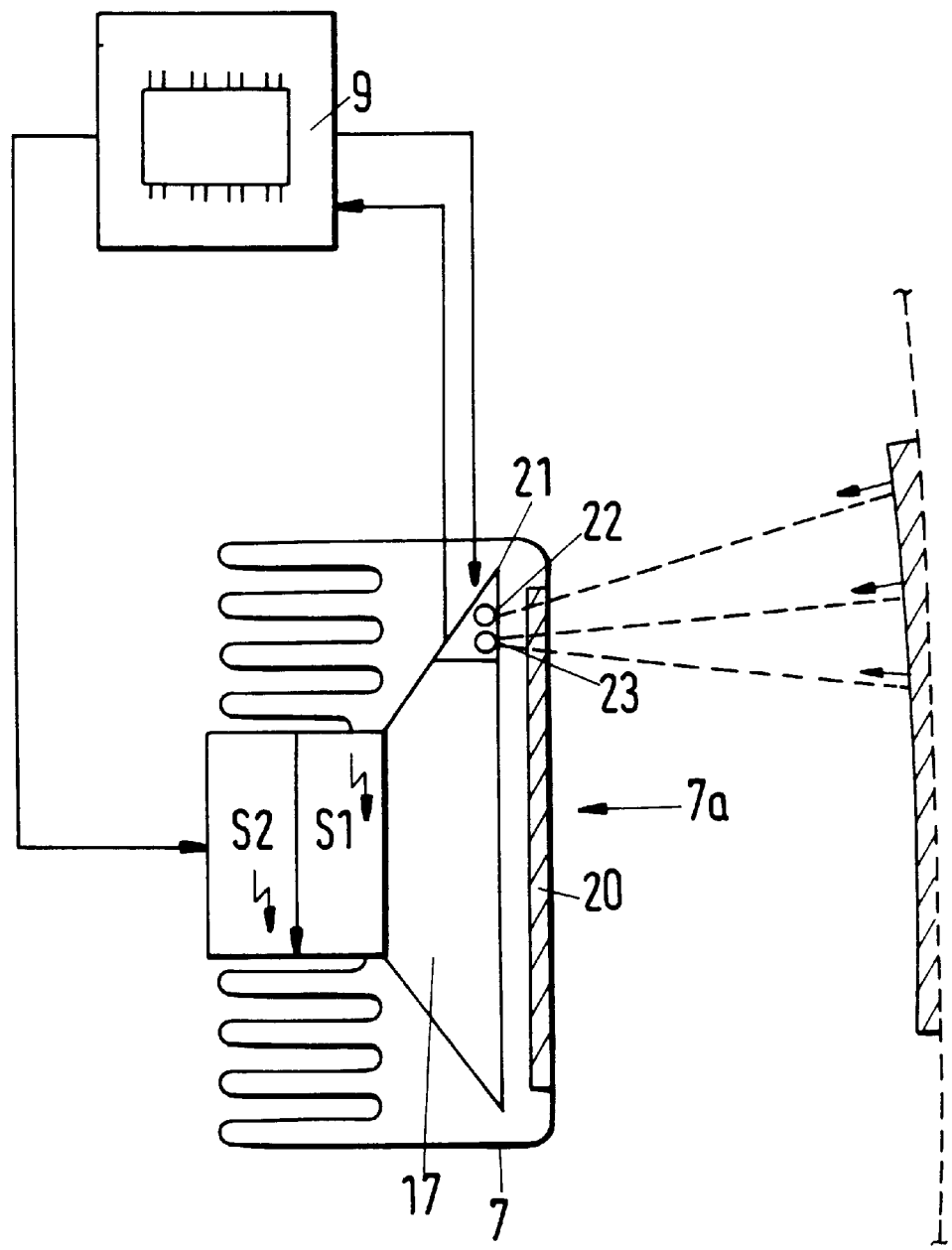
FIG. 9, a view showing a further variant of the invention.

Alternatively to the sensor principles previously described, or additionally as further security, the use of infrared technology may be considered. Regarding this, FIG. 9 shows the cover section 7a of the air bag 7 with a reflecting medium 20. The reflecting medium 20 may be an integral component of the air bag fabric or may be produced by means of foil coating or vapor deposition. Another essential component is a structural unit 21, in which are combined an infrared emitter 22 and an infrared receiver 23. Here, the structural unit 21 is fastened in the edge region of the diffusor 17 so that the mass flows emerging from the gas generators S1 and optionally also S2 blow away from the sensor system.

The section of the air bag 7 represented by broken lines shows the reflecting medium 20 in a position after initiation of the inflation process. Initiation of stage S1 by the control means 9 is attended by activation of the infrared emitter 22. Accordingly, the latter goes into operation only when it is actually needed. Therefore, it need not be kept in constant readiness. Placement and alignment of the infrared emitter 22 are chosen in conjunction with the infrared receiver 23, so that upon expansion of the air bag 7, the radiation reflected by the reflecting medium 20 can be evaluated with regard to travel times and/or differences in travel time, in order to transmit signals for the expansion behavior of the air bag 7 to the control unit 9.

I claim:

1. A passenger protection arrangement for a vehicle comprising:
    at least one air bag;
    an inflation device for filling the air bag;
    control means for controlling the operation of the inflation device so as to control a filling characteristic of the air bag; and
    sensor means including a bag expansion detector for detecting the expansion behavior of a specified section of the air bag and supplying a corresponding signal to the control means to control the filling characteristic of the air bag.

2. A passenger protection arrangement according to claim 1 wherein the bag expansion detector comprises:
    a tension member connected with the specified section; and
    at least one transducer coupled to the tension member and responsive thereto to supply a signal to the control means.

3. A passenger protection arrangement according to claim 2 wherein the transducer is a tachometer.

4. A passenger protection arrangement according to claim 2 wherein:
    the tension member includes magnetically active metal particles; and
    the transducer is arranged to detect magnetic asymmetries generated by motion of the metal particles during inflation of the air bag.

5. A passenger protection arrangement according to claim 2 wherein:

the tension member includes a stripe pattern; and the transducer comprises an optical sensor responsive to motion of the stripe pattern during inflation of the air bag for detection of expansion behavior.

6. A passenger protection arrangement according to claim 1 wherein the sensor means comprises:

at least one pressure sensitive layer film fastened to the specified section of the air bag; and a signal-transmitting line for transmitting signals from the pressure sensitive layer to the control unit.

7. A passenger protection arrangement according to claim 1 wherein the sensor means comprises:

at least one piezo element fastened to the specified section of the air bag; and signal-transmitting means for transmitting signals from the at least one piezo element to the control unit.

8. A passenger protection arrangement according to claim 1 wherein the control unit includes storage means for storing in at least one characteristics field at least one reference characteristic defining air bag expansion behavior with time when the expansion is unimpeded by an obstacle, and means for comparing signals generated by the sensor means after activation of the inflation device with the at least one reference characteristic and generating a control signal for influencing operation of the inflation device upon occurrence of a specified difference between the signals and the reference characteristic.

9. A passenger protection arrangement according to claim 1 wherein the inflation device comprises a gas generator having a mass flow which is variably adjustable and wherein the mass flow of the gas generator is controlled by the control means in response to signals from the sensor means.

10. A passenger protection arrangement according to claim 9 wherein the inflation device includes a valve structure by which the mass flow of gas produced by the gas generator after initial filling of the air bag is at least partially directable outside the air bag in response to a signal from the control means based on a signal produced by the sensor means.

11. A passenger protection arrangement according to claim 1 wherein the location of the specified section of the air bag is chosen with reference to the operation of the inflation device so that, upon filing of the air bag, the specified section is the first section to be impacted by the mass flow of gas.

12. A passenger protection arrangement according to claim 1 wherein the air bag is folded around the inflation device and the air bag and the inflation device form an air bag module.

13. A passenger protection arrangement according to claim 2 wherein the transducer is fastened to a housing for the inflation device.

14. A passenger protection arrangement according to claim 1 wherein the vehicle includes a dashboard and a floor space beneath the dashboard and wherein the air bag is located in a region of the floor space which is below the dashboard and is set back behind the face of the dashboard.

15. A passenger protection arrangement according to claim 14 wherein the dashboard has surface sections facing the floor space which form a firing channel for the air bag.

16. A passenger protection arrangement according to claim 14 wherein the air bag is positioned below the dashboard without any airbag cover.

17. A passenger protection arrangement according to claim 15 wherein the shape of the firing channel is selected so that an air bag mounted in the dashboard is not apparent to a passenger properly accommodated on an adjacent vehicle seat.

18. A passenger protection arrangement according to claim 1 wherein the sensor means comprises:

at least one extendable member which is fastened at a first end to the specified section of the air bag and at a second end at least indirectly to a fixed structure part and which is capable of being extended from a normal rest condition by inflation of the air bag;

at least one tearing element which is fastened at a first end to the extendable member in the region of the specified section of the airbag and at a second end at least indirectly to the fixed structural part, and which is capable of being separated from one of the extrudable member and the fixed structural part to generate a sensor signal.

19. A passenger protection arrangement according to claim 18 wherein the extendable member is a strap folded together in loops and the at least one tearing element includes a plurality of straplike tearing elements fastened to corresponding portions of the extendable member, the corresponding portions being distributed along the length of the extendable member according to a predetermined arrangement.

20. A passenger protection arrangement according to claim 18 including an electric signal line which is actuatable to supply a sensing signal by the separation of the at least one tearing element from the fixed structural part.

21. A passenger protection arrangement according to claim 18 wherein the fixed structural part comprises a plug base in which a plug held at the second end of the tearing element is capable of being secured; and the plug is releasable from the plug base by the action of the inflation device to generate a sensor signal.

22. A passenger protection arrangement according to claim 18 wherein the control means include storage means for storing a characteristics field having at least one specified time interval between the time of release of the inflation device and the time of generation of a sensor signal resulting from separation from the fixed structural part or from the extendable member, and wherein the control unit generates a control signal to vary the filling characteristic of the air bag when the sensor signal is not detected within the specified time interval after release of the inflation device.

23. A passenger protection arrangement according to claim 1 wherein the sensor means comprises:

at least on infrared emitter capable of being turned on by the control means;

at least one reflecting region on the specified portion of the air bag to reflect infrared light; and at least one infrared receiver, connected to the control means for detecting infrared radiation received from the reflecting medium.

24. A passenger protection arrangement according to claim 23 wherein the reflecting region has a reflective coating on the air bag surface.

25. A passenger protection arrangement according to claim 23 wherein the air bag is made of an infrared light-reflecting fabric.

26. A passenger protection arrangement according to claim 23 wherein the infrared emitter and the infrared receiver are combined into a structural unit.

27. A passenger protection arrangement according to claim 26 wherein the structural unit is fastened to a housing for the inflation device.

* * * * *